(12) United States Patent
Huang et al.

(10) Patent No.: US 11,132,023 B2
(45) Date of Patent: Sep. 28, 2021

(54) CASING OF ELECTRONIC DEVICE WITH CONTINUOUS PATTERN STRUCTURES

(71) Applicant: ASUSTEK COMPUTER INC., Taipei (TW)

(72) Inventors: Meng-Chu Huang, Taipei (TW); Chieh Mii, Taipei (TW); Fu-Yu Cai, Taipei (TW); Chia-Hao Hung, Taipei (TW); Shang-Chih Liang, Taipei (TW); Ming-Chih Huang, Taipei (TW); Tong-Shen Hsiung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/854,296

(22) Filed: Apr. 21, 2020

(65) Prior Publication Data
US 2020/0333842 A1    Oct. 22, 2020

(30) Foreign Application Priority Data

Apr. 22, 2019  (CN) .......................... 201910325603.1

(51) Int. Cl.
*G06F 1/16* (2006.01)
(52) U.S. Cl.
CPC .................................. *G06F 1/1633* (2013.01)
(58) Field of Classification Search
CPC .... G06F 1/1616; G06F 1/1633; G06F 1/1637; G06F 1/1656; G09F 13/165; G09F 2013/045; G09F 2013/1872; G09F 19/02
See application file for complete search history.

(56) References Cited

U.S. PATENT DOCUMENTS 8,854,801 B2 * 10/2014 Bergeron .............. G06F 1/1616
                                                           361/679.21
9,600,034 B2 *  3/2017 Kiple .................... G06F 1/1679
(Continued)

FOREIGN PATENT DOCUMENTS

CN         101697652 A     4/2010
CN         206697694 U    12/2017

*Primary Examiner* — Tsion Tumebo
(74) *Attorney, Agent, or Firm* — Muncy, Geissler, Olds & Lowe, P.C.

(57) ABSTRACT

A casing of an electronic device including successive pattern structures is provided, including a first body, a second body, a first light emitting pattern, and a second light emitting pattern. The first body includes an outer surface and an inner surface, and the outer surface includes a first side edge. The second body includes an upper surface and a pivoting structure. The upper surface includes a covered area and an exposed area. The first body is pivotally connected to the second body through the pivoting structure, and the pivoting structure is located between the covered area and the exposed area. The first light emitting pattern is located on the outer surface and includes a first end extending to the first side edge. A second light emitting pattern, located on the exposed area, and including a second end. When the inner surface covers the covered area, the first end is aligned with the second end. The casing of the electronic device forms a visually successive light emitting pattern according to pattern structures on different bodies. In this way, even when the successive pattern structures are not physically connected, a more diversified and more powerful light emitting effect is provided.

9 Claims, 8 Drawing Sheets

(56) References Cited

U.S. PATENT DOCUMENTS

| | | | |
|---|---|---|---|
| 10,326,866 B2* | 6/2019 | Lee | G06F 3/0346 |
| 10,542,128 B2* | 1/2020 | Kang | G06F 1/1652 |
| 10,645,205 B2* | 5/2020 | Lee | H04M 1/0268 |
| 2002/0024499 A1* | 2/2002 | Karidis | G06F 1/1632 |
| | | | 345/156 |
| 2004/0223689 A1* | 11/2004 | Lempkowski | G02B 6/3604 |
| | | | 385/26 |
| 2008/0253070 A1* | 10/2008 | Rissanen | H04M 1/0218 |
| | | | 361/679.01 |
| 2010/0202105 A1* | 8/2010 | Chang | G06F 1/1616 |
| | | | 361/679.27 |
| 2011/0126141 A1* | 5/2011 | King | G06F 3/04817 |
| | | | 715/769 |
| 2012/0026095 A1* | 2/2012 | Tanaka | G06F 1/181 |
| | | | 345/168 |
| 2012/0084694 A1* | 4/2012 | Sirpal | G06F 3/0484 |
| | | | 715/769 |
| 2013/0279096 A1* | 10/2013 | Gengler | G06F 1/1669 |
| | | | 361/679.01 |
| 2014/0160654 A1* | 6/2014 | Yoo | G06F 1/1681 |
| | | | 361/679.12 |
| 2014/0168937 A1* | 6/2014 | Kato | G06F 1/1616 |
| | | | 362/23.03 |
| 2014/0362513 A1* | 12/2014 | Nurmi | G06F 1/1652 |
| | | | 361/679.27 |
| 2015/0009448 A1* | 1/2015 | Cheng | G06F 1/1656 |
| | | | 349/58 |
| 2016/0026381 A1* | 1/2016 | Kim | G06F 3/04886 |
| | | | 715/761 |
| 2016/0041329 A1* | 2/2016 | Lin | H01H 13/83 |
| | | | 362/97.1 |
| 2017/0052566 A1* | 2/2017 | Ka | G06F 1/1694 |
| 2017/0316750 A1* | 11/2017 | Yamazaki | G06F 1/188 |
| 2018/0068609 A1* | 3/2018 | Yamazaki | G06F 1/1649 |
| 2018/0074553 A1* | 3/2018 | Yamazaki | G09F 9/30 |
| 2018/0227399 A1* | 8/2018 | Lee | G06F 1/1698 |
| 2018/0375975 A1* | 12/2018 | Kikuchi | G06F 1/1679 |

* cited by examiner

CASING OF ELECTRONIC DEVICE WITH CONTINUOUS PATTERN STRUCTURES

CROSS-REFERENCE TO RELATED APPLICATION

This application claims the priority benefit of Chinese Application Ser. No. 201910325603.1, filed on Apr. 22, 2019. The entirety of the above-mentioned patent application is hereby incorporated by reference herein and made a part of the specification.

BACKGROUND OF THE INVENTION

Field of the Invention

The disclosure relates to a casing, and in particular, to a casing of an electronic device.

Description of the Related Art

The appearance design of electronic devices (such as notebook computers) is a critical factor to highlight the distinct features of products and attract the attention of customers. In particular, applying light effects to electronic devices, i.e., the light bars, becomes more and more popular. However, because the conventional electronic devices are limited by the structure of the light bars, the continuous pattern structures are only presented on parts of the electronic device and emits as single-point light, which cannot present continuously light effect on multiple surfaces.

BRIEF SUMMARY OF THE INVENTION

The disclosure provides a casing of an electronic device. The casing of the electronic device includes a first body, a second body, a first light emitting pattern, and a second light emitting pattern. The first body includes an outer surface and an inner surface, and the outer surface comprises a first side edge. The second body includes an upper surface and a pivoting structure. The upper surface includes a covered area and an exposed area. The first body is pivotally connected to the second body through the pivoting structure, and the pivoting structure is located between the covered area and the exposed area. The first light emitting pattern is located on the outer surface and includes a first end extending to the first side edge. The second light emitting pattern is located on the exposed area and includes a second end. When the first body covers the covered area, the first end is aligned with the second end.

The casing of the electronic device provided in the disclosure produces a visually continuous light emitting pattern according to continuous pattern structures on different bodies of the casing of the electronic device. In this way, even when the continuous pattern structures are not physically connected, a more diversified and more powerful light emitting effect is provided.

Specific embodiments of the disclosure will be further described by using the following examples and drawings.

BRIEF DESCRIPTION OF THE DIAGRAMS

DETAILED DESCRIPTION OF THE EMBODIMENTS

Specific embodiments of the disclosure will be described in further detail below with reference to schematic drawings. The advantages and features of the disclosure will become more apparent from the following description and claims. It should be noted that the drawings are all in a very simplified form and are not drawn to accurate scale, but are merely used for convenience and clarity of description of the embodiments of the disclosure.

Figure 1:
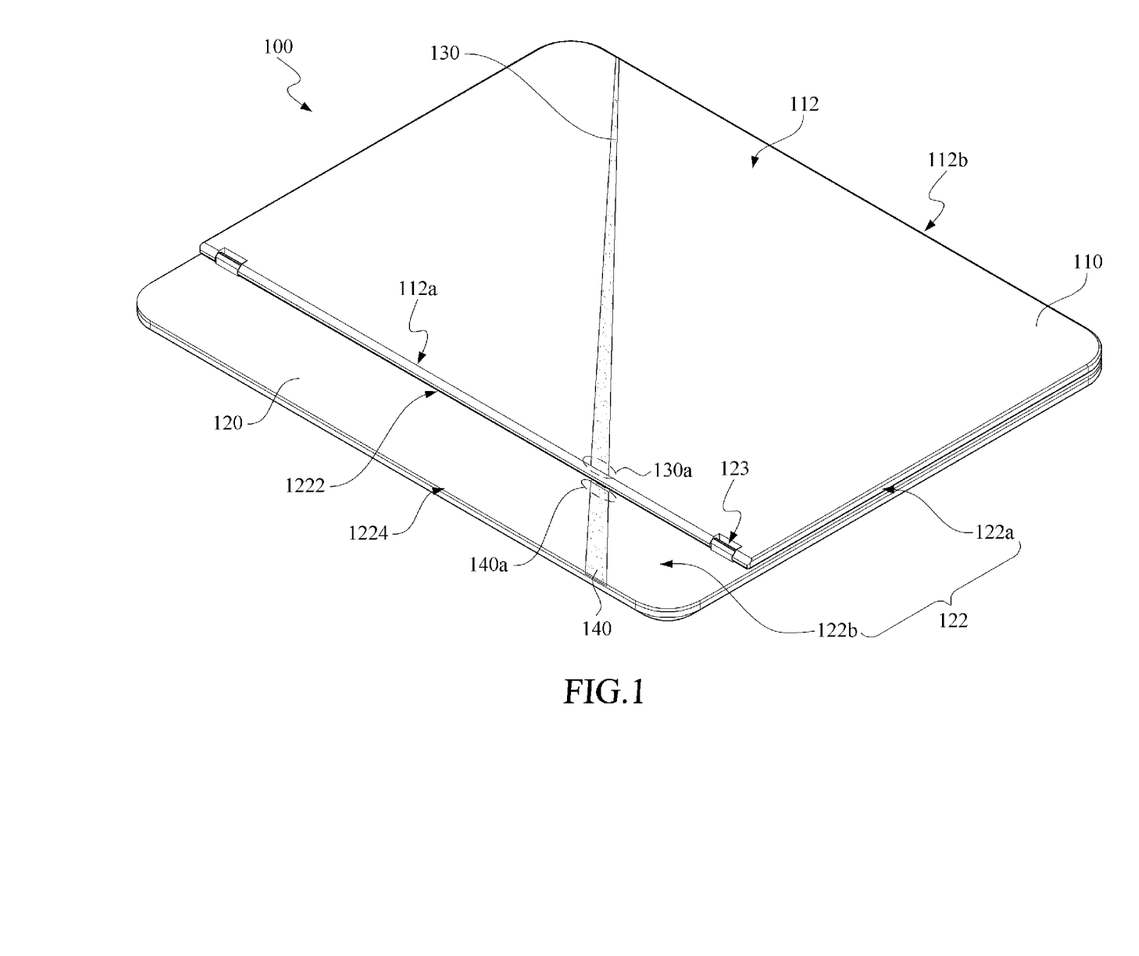
FIG. 1 is a schematic three-dimensional diagram of a first embodiment of a casing of an electronic device according to the disclosure.

FIG. 1 is a schematic three-dimensional diagram of a first embodiment of an electronic device 100 according to the disclosure. In this embodiment, the electronic device 100 is a notebook computer. The casing of the electronic device 100 includes a first body 110, a second body 120, a first light emitting pattern 130, and a second light emitting pattern 140. The first body 110 is a screen part of the notebook computer, and the second body 120 is a keyboard part of the notebook computer. The electronic device 100 in FIG. 1 is in a closed state.

Figure 7:
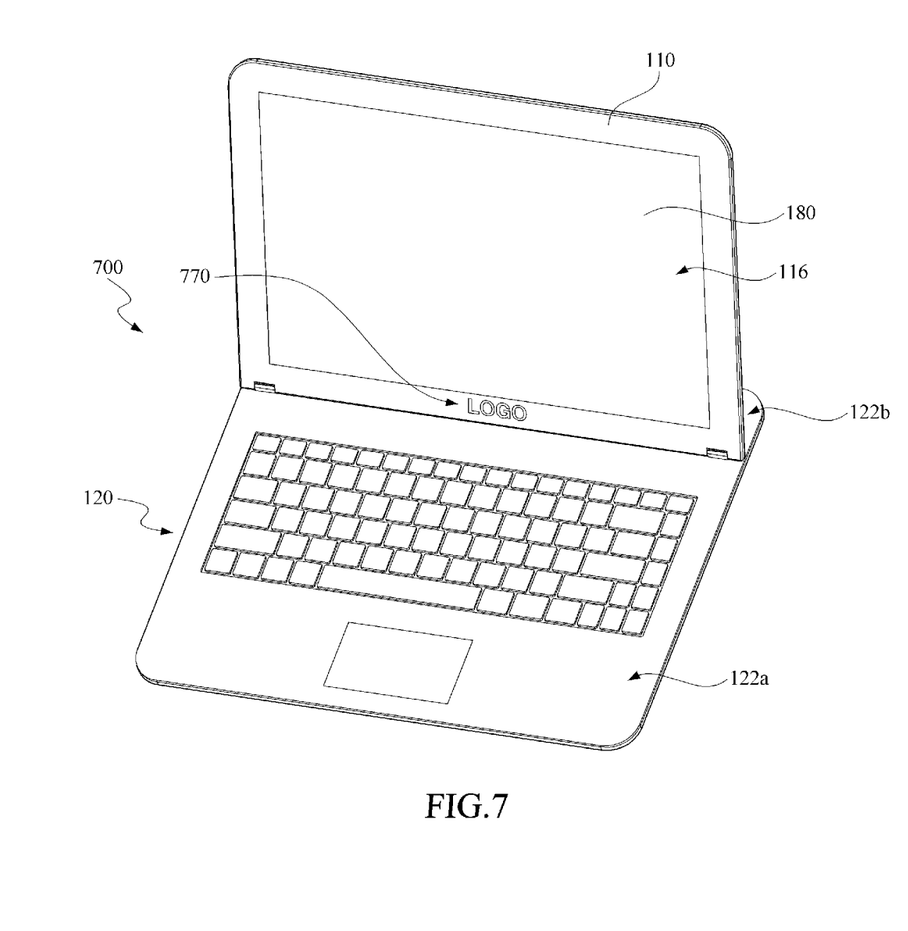
FIG. 7 is a schematic three-dimensional diagram of a seventh embodiment of a casing of an electronic device according to the disclosure.

The first body 110 includes an outer surface 112 and an inner surface 116 (referring to FIG. 7). The second body 120 includes an upper surface 122 and a pivoting structure 123. The first body 110 is pivotally connected to the upper surface 122 of the second body 120 through the pivoting structure 123, and the upper surface 122 of the second body 120 is divided into a covered area 122a and an exposed area 122b. To be specific, the pivoting structure 123 is located between the covered area 122a and the exposed area 122b. When the electronic device 100 is in the closed state, the covered area 122a is covered by the first body 110. The exposed area 122b refers to an area not covered by the first body 110 on the upper surface 122 of the second body 120. As shown in the figure, the exposed area 122b is located on a rear side of the electronic device 100. The position where the user operates the electronic device is defined as a front side, and the side where is away from the front side, is referred to a rear side.

The first light emitting pattern 130 is located on the outer surface 112 of the first body 110. The second light emitting pattern 140 is located in the exposed area 122b on the upper surface 122 of the second body 120. A first end 130a of the first light emitting pattern 130 extends to a first side edge 112a of the outer surface 112 of the first body 110. A second end 140a of the second light emitting pattern is aligned with the first light emitting pattern 130, and the second end 140a is located on a side of the second light emitting pattern 140 close to the first body 110.

In an embodiment, the outer surface 112 includes a second side edge 112b opposite to the first side edge 112a, and the first light emitting pattern 130 extends from the first side edge 112a to the second side edge 112b. In an embodiment, the exposed area 122b includes a first side 1222 and a second side 1224. The second end 140a of the second light emitting pattern 140 extends to the first side 1222, and the second light emitting pattern 140 extends from the first side 1222 to the second side 1224.

In this embodiment, the first light emitting pattern 130 is a linear light emitting pattern, and the second light emitting pattern 140 is also a linear light emitting pattern. The first light emitting pattern 130 extends to the second light emitting pattern 140, and a width of the first end 130a of the first light emitting pattern 130 is roughly the same as the corresponding second end 140a of the second light emitting pattern 140, to present a continuous light emitting effect without a connecting gap. In some embodiments, the first light emitting pattern 130 and the second light emitting pattern 140 are curved continuous pattern structures or other irregular line patterns.

Figure 2:
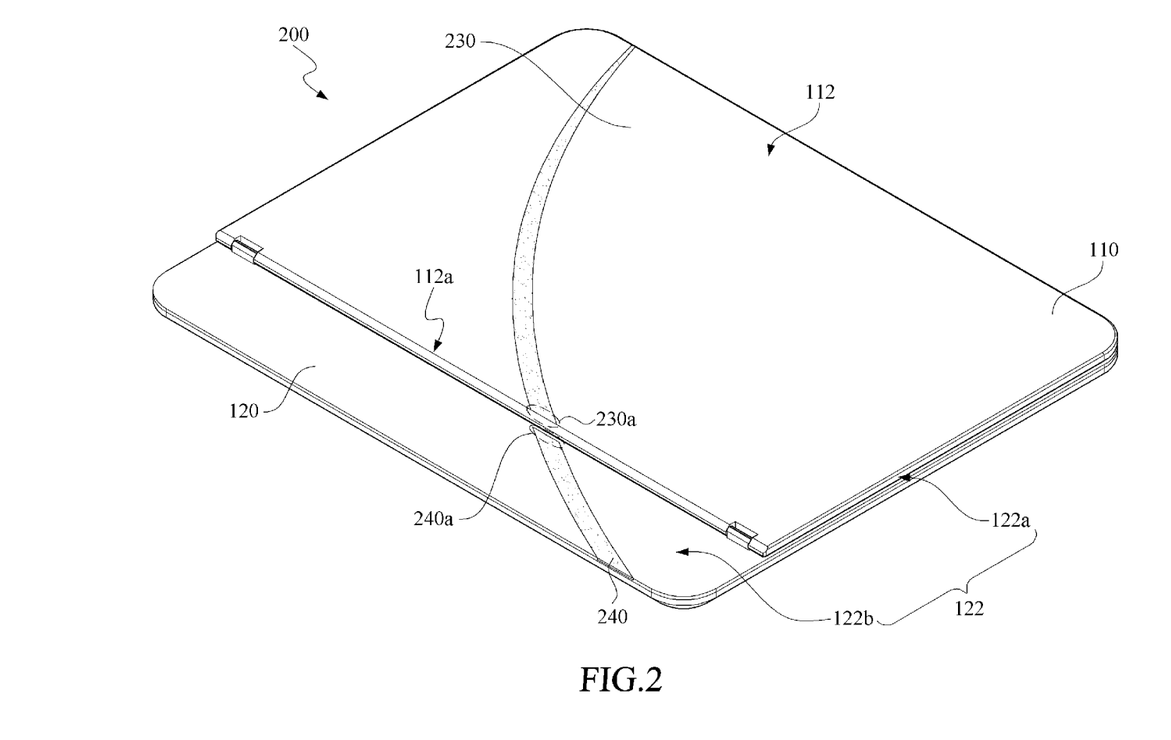
FIG. 2 is a schematic three-dimensional diagram of a second embodiment of a casing of an electronic device according to the disclosure.

FIG. 2 is a schematic three-dimensional diagram of a second embodiment of a casing of an electronic device 200 according to the disclosure. Compared with the embodiment in FIG. 1 where the first light emitting pattern 130 is a linear light emitting pattern as well as the second light emitting pattern 140. In this embodiment, a first light emitting pattern 230 is a curved light emitting pattern, and a second light emitting pattern 240 is also a curved light emitting pattern. A first end 230a of the first light emitting pattern 230 extends to the first side edge 112a of the outer surface 112 of the first body 110. The first end 230a is aligned with a corresponding second end 240a of the second light emitting pattern 240. The first end 230a extends to the second end 240a of the second light emitting pattern 240, to generate a continuous light emitting effect.

Figure 3:
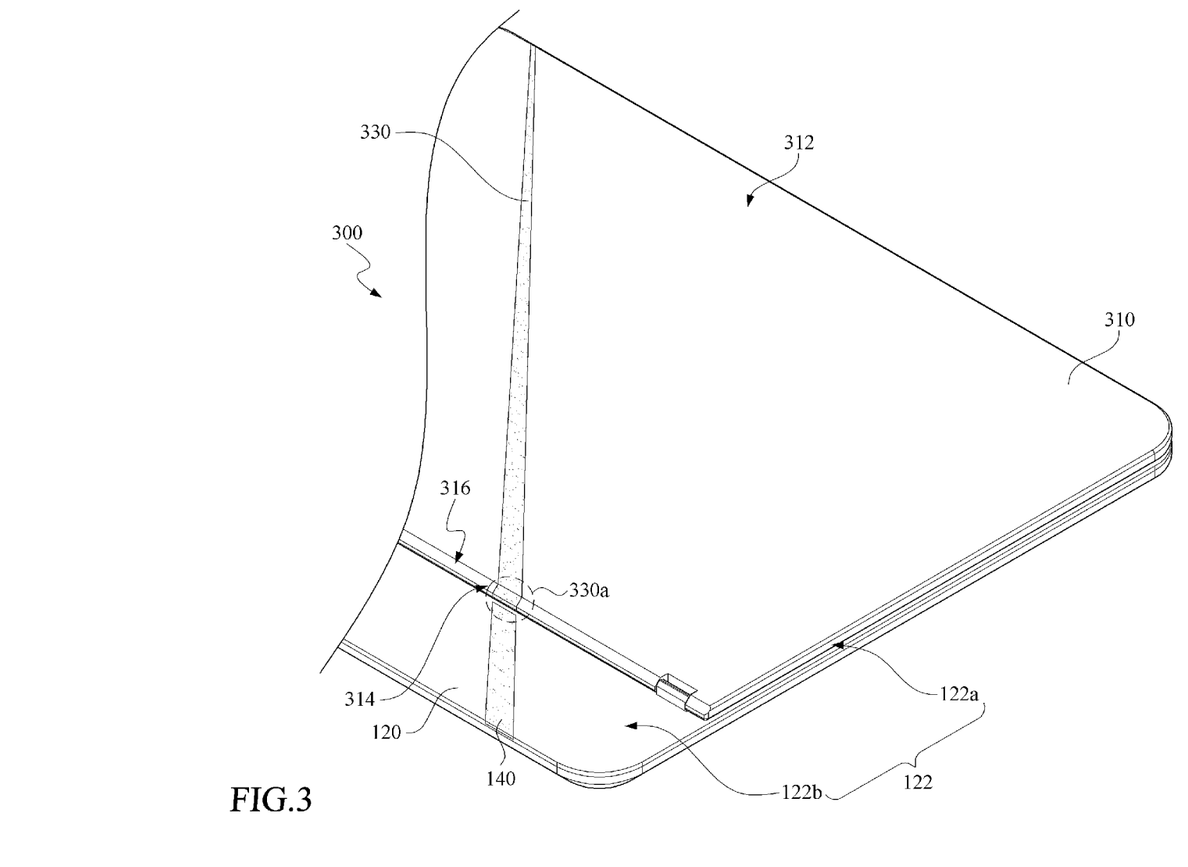
FIG. 3 is a schematic three-dimensional diagram of a third embodiment of a casing of an electronic device according to the disclosure.

FIG. 3 is a schematic three-dimensional diagram of a third embodiment of an a casing of electronic device 300 according to the disclosure. Compared with the embodiment in FIG. 1 where the first end 130a of the first light emitting pattern 130 extends to the first side edge 112a of the outer surface 112 of the first body 110, to generate a continuous light emitting effect of the first light emitting pattern 130 and the second light emitting pattern 140. In this embodiment, a first end 330a of a first light emitting pattern 330 further extends from an outer surface 312 of a first body 310 to a rear surface 314 of the first body 310. In addition, a chamfer 316 is formed between the rear surface 314 and the outer surface 312 of the first body 310, and to improve the continuity of the light emitting effect of the continuous pattern structures when viewed from different angles.

Figure 4:
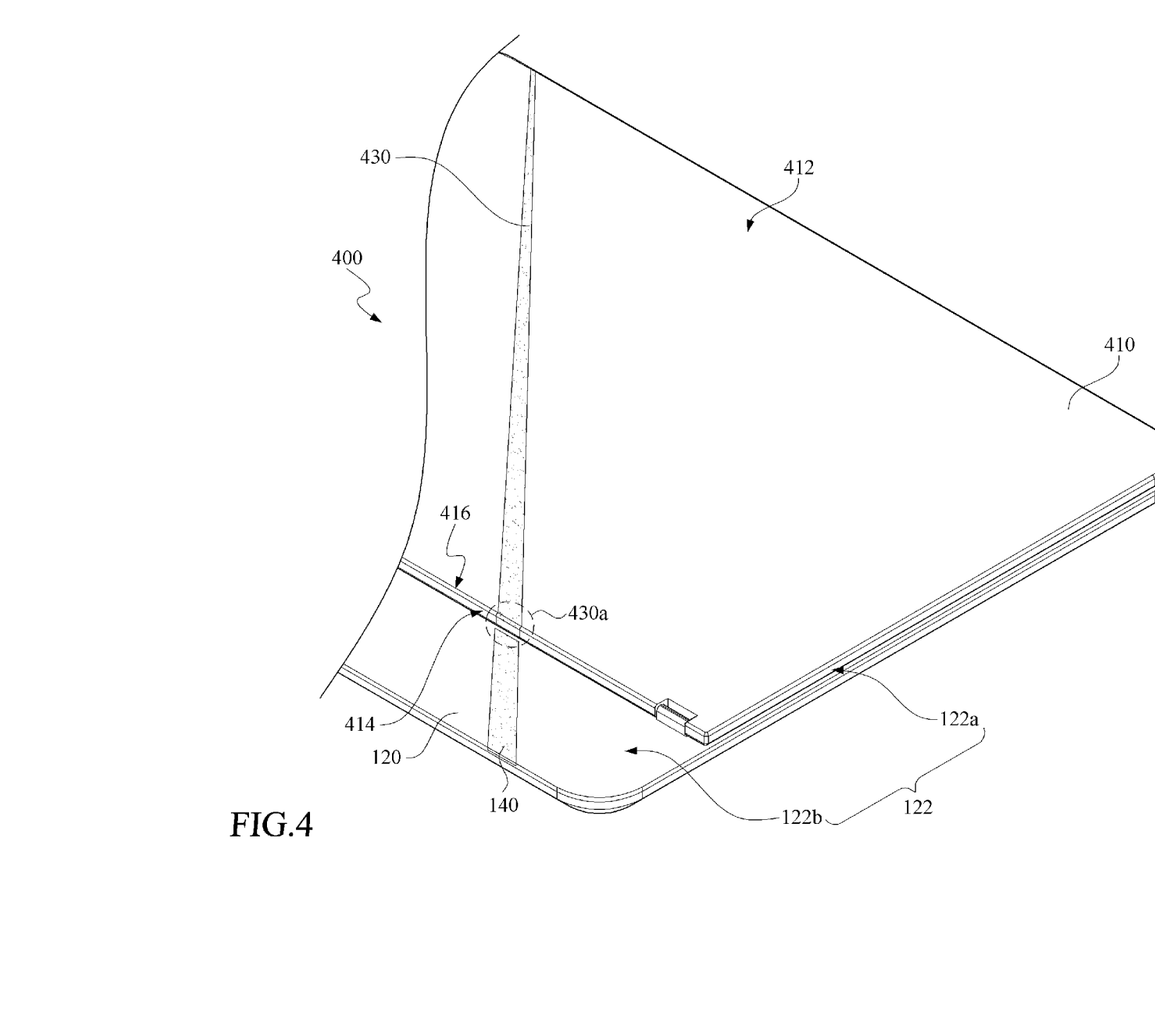
FIG. 4 is a schematic three-dimensional diagram of a fourth embodiment of a casing of an electronic device according to the disclosure.

FIG. 4 is a schematic three-dimensional diagram of a fourth embodiment of an a casing of electronic device 400 according to the disclosure. Compared with the embodiment in FIG. 3 where the chamfer 316 is formed between the rear surface 314 and the outer surface 312 of the first body 310. In this embodiment, a fillet 416 is formed between a rear surface 414 and an outer surface 412 of a first body 410. A first end 430a of a first light emitting pattern 430 extends from the outer surface 412 of the first body 410 to the rear surface 414 of the first body 410 through the fillet 416, to improve the continuity of the light emitting effect of the continuous pattern structures when viewed from different angles.

Figure 5:
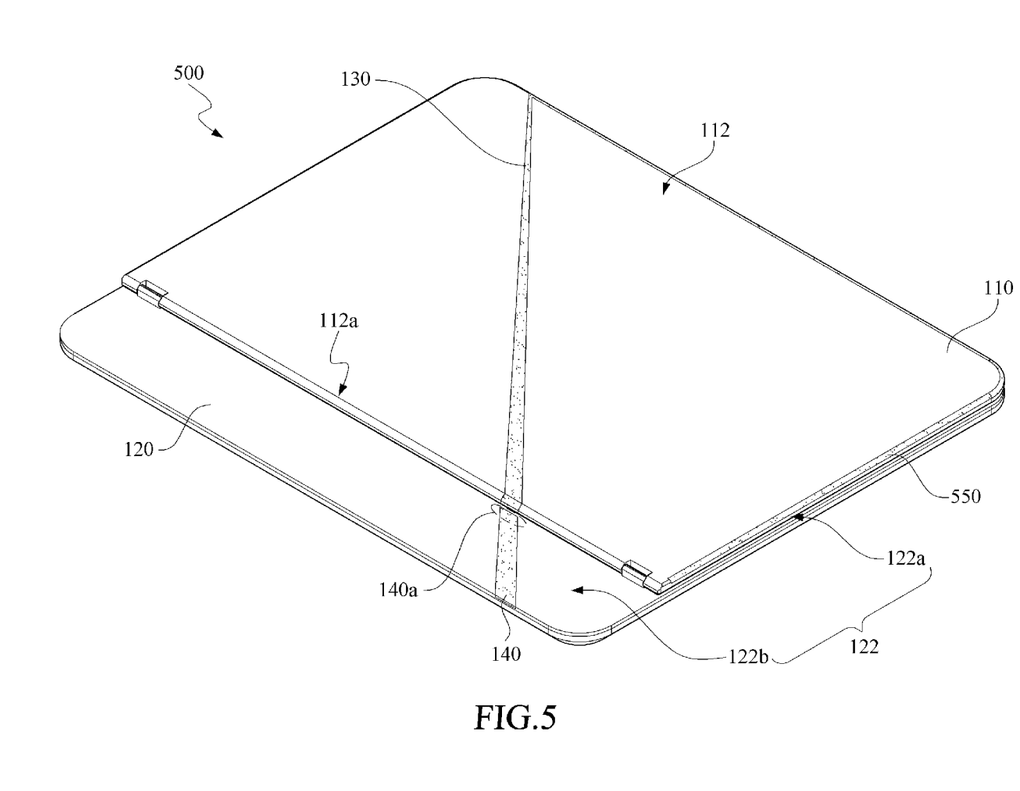
FIG. 5 is a schematic three-dimensional diagram of a fifth embodiment of a casing of an electronic device according to the disclosure.

FIG. 5 is a schematic three-dimensional diagram of a fifth embodiment of an a casing of electronic device 500. Compared with the embodiment in FIG. 1, in addition to the first light emitting pattern 130 and the second light emitting pattern 140, the casing of the electronic device 500 in this embodiment further includes a third light emitting pattern 550. The third light emitting pattern 550 surrounds the first body 110, and connects to the first light emitting pattern 130.

Figure 6:
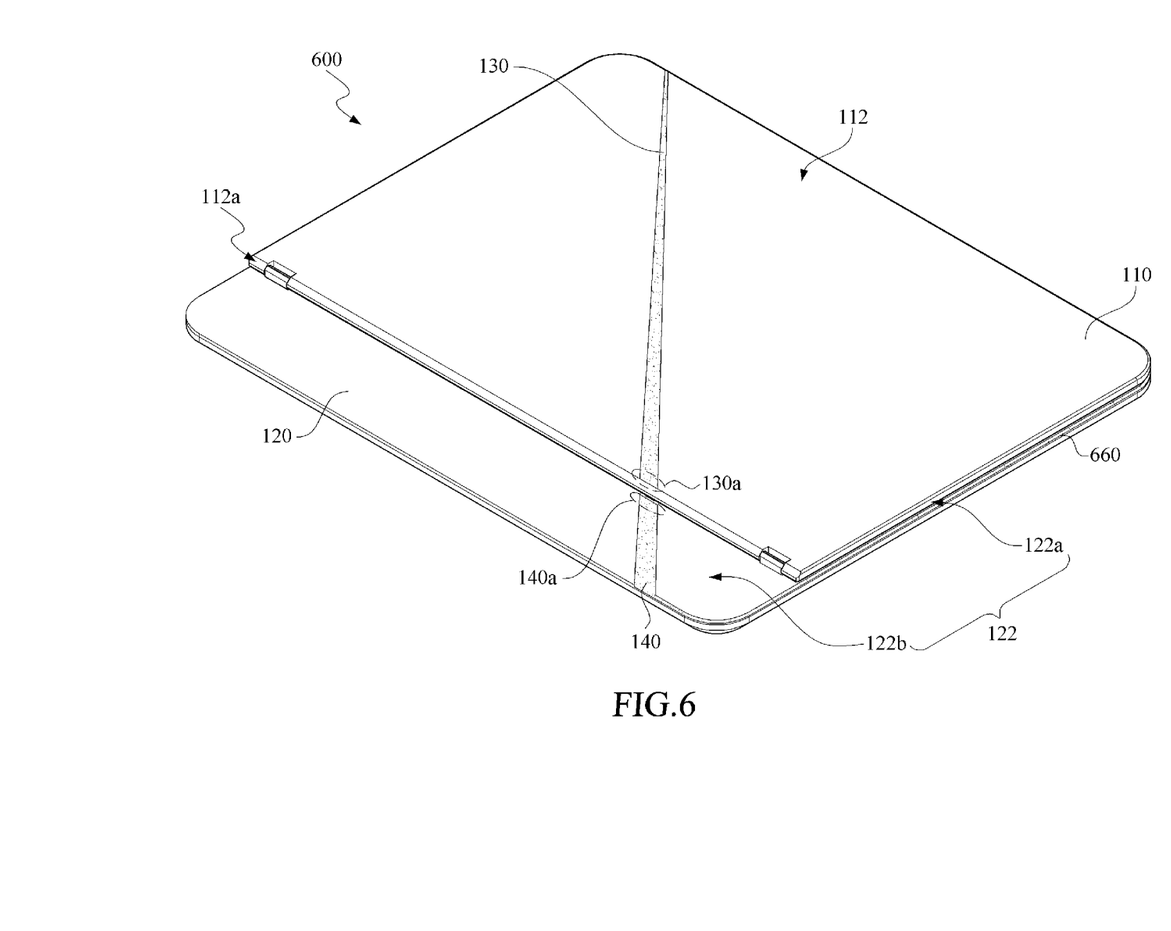
FIG. 6 is a schematic three-dimensional diagram of a sixth embodiment of a casing of an electronic device according to the disclosure.

FIG. 6 is a schematic three-dimensional diagram of a sixth embodiment of an a casing of electronic device 600. Compared with the embodiment in FIG. 1, in addition to the first light emitting pattern 130 and the second light emitting pattern 140, the casing of the electronic device 600 in this embodiment further includes a fourth light emitting pattern 660. The fourth light emitting pattern 660 surrounds the second body 120, and connects to the second light emitting pattern 140.

FIG. 7 is a schematic three-dimensional diagram of a seventh embodiment of a casing of an electronic device 700. The electronic device 700 in the figure is in an open state to show a screen 180 on the first body 110. Compared with the embodiment in FIG. 1, in addition to the first light emitting pattern 130 and the second light emitting pattern 140, the casing of the electronic device in this embodiment further includes a fifth light emitting pattern 770. The fifth light emitting pattern 770 is located on the inner surface 116 of the first body 110. In an embodiment, the screen 180 is disposed on the inner surface 116 of the first body 110, and the fifth light emitting pattern 770 is located below the screen 180. In an embodiment, the fifth light emitting pattern is a light emitting logo (LOGO).

Figure 8:
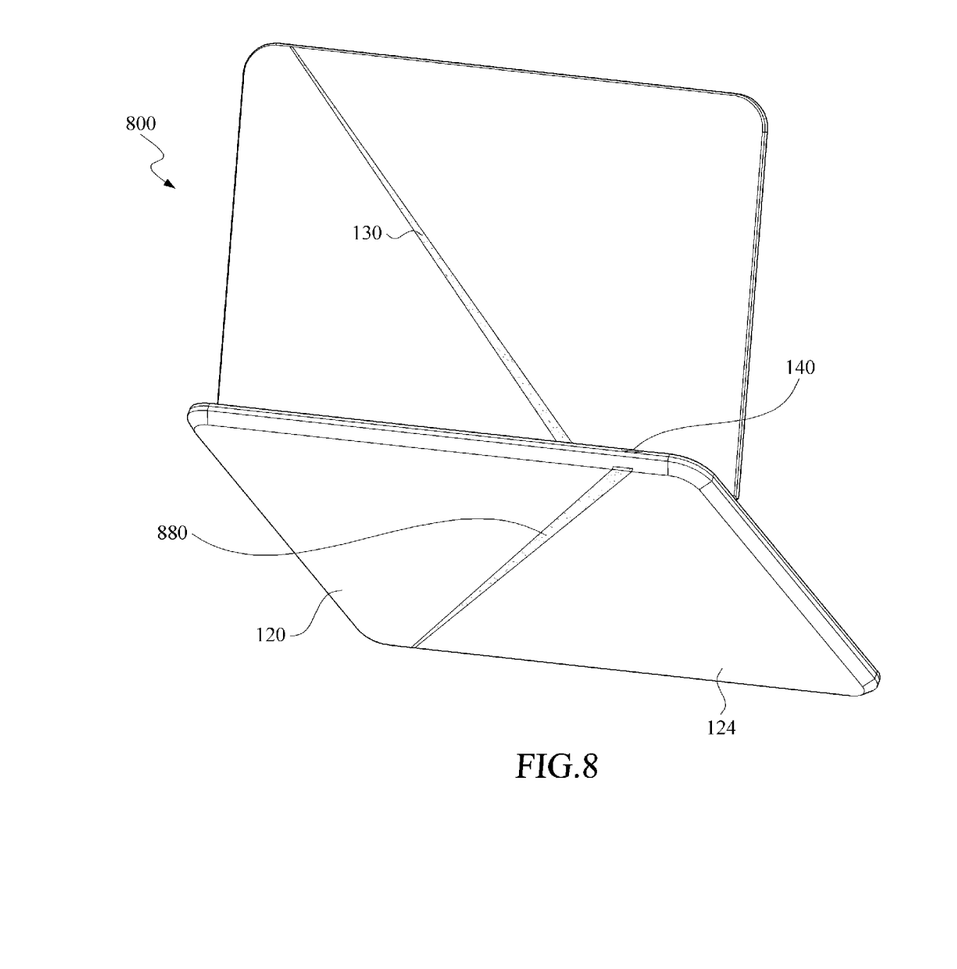
FIG. 8 is a schematic three-dimensional diagram of an eighth embodiment of a casing of an electronic device according to the disclosure.

FIG. 8 is a schematic three-dimensional diagram of an eighth embodiment of a casing of an electronic device 800 according to the disclosure. The electronic device 800 in the figure shows a viewing angle from a lower surface 124 of a second body 120. Compared with the embodiment in FIG. 1, in addition to the first light emitting pattern 130 and the second light emitting pattern 140, the casing of the electronic device in this embodiment further includes a sixth light emitting pattern 880. The sixth light emitting pattern 880 is located on the lower surface 124 of the second body 120, and one end of the sixth light emitting pattern 880 is aligned with the second light emitting pattern 140.

The foregoing embodiments use a notebook computer as an example to describe the disclosure. Any electronic device operable by a user and formed by pivotally connecting to a plurality of bodies is applicable to the disclosure.

Compared with the conventional electronic devices which perform only single-point light emission, the electronic devices provided in the disclosure adopts the positions and shapes of the continuous pattern structures on different electronic bodies to produce a continuous light emitting effect even when the continuous pattern structures are not physically connected. Thus a more diversified and more powerful light emitting effect is provided.

Although the disclosure has been described with reference to the above embodiments, the embodiments are not intended to limit the disclosure. A person of ordinary skill in the art may make variations and improvements without departing from the spirit and scope of the disclosure. Therefore, the protection scope of the disclosure should be subject to the appended claims.

What is claimed is:
1. A casing of an electronic device with successive light emitting pattern structures, comprising:

a first body, comprising an outer surface and an inner surface, wherein the outer surface comprises a first side edge;

a second body, comprising an upper surface and a pivoting structure, wherein the upper surface comprises a covered area and an exposed area, the first body is pivotally connected to the second body through the pivoting structure, and the pivoting structure is located between the covered area and the exposed area;

a first light emitting pattern, located on the outer surface, and comprising a first end extending to the first side edge; and a second light emitting pattern, located on the exposed area, and comprising a second end, wherein when the first body covers the covered area of the second body, the exposed area of the second body is exposed and the first end is aligned with the second end, wherein the first light emitting pattern extends to the second light emitting pattern.

2. The casing of the electronic device according to claim 1, wherein the first light emitting pattern and the second light emitting pattern are linear pattern structures.

3. The casing of the electronic device according to claim 1, wherein the outer surface comprises a second side edge opposite to the first side edge, and the first light emitting pattern extends from the first side edge to the second side edge.

4. The casing of the electronic device according to claim 1, wherein the exposed area comprises a first side and a second side, the second end extends to the first side, and the second light emitting pattern extends from the first side to the second side.

5. The casing of the electronic device according to claim 1, further comprising a third light emitting pattern surrounding the first body, wherein the third light emitting pattern is connected to the first light emitting pattern.

6. The casing of the electronic device according to claim 1, further comprising a fourth light emitting pattern surrounding the second body, wherein the fourth light emitting pattern is connected to the second light emitting pattern.

7. The casing of the electronic device according to claim 1, further comprising a fifth light emitting pattern located on the inner surface.

8. The casing of the electronic device according to claim 1, wherein the first light emitting pattern extends to a rear surface of the first body.

9. The casing of the electronic device according to claim 8, wherein the rear surface comprises a chamfer or a fillet.

* * * * *